UNITED STATES PATENT OFFICE 2,648,675

METHOD FOR PREPARING THIOLANE AND ITS HOMOLOGS

George B. Hatch, Fishkill, N. Y., assignor to The Texas Company, New York, N. Y., a corporation of Delaware No Drawing. Application August 6, 1948, Serial No. 43,016

13 Claims. (Cl. 260—329)

This invention relates to a method for preparing thiolane compounds by the hydrogenation of thiophene compounds.

In accordance with this invention, thiolane and its homologs are prepared by reacting thiophene and thiophene homologs with hydrogen at a temperature in the range of 400 to 600° F. and at a pressure of at least 1,000 pounds per square inch in the presence of a catalyst comprising mainly an oxide or sulfide of a metal of group VIB of the periodic table. Molybdenum sulfide-alumina and nickel sulfide-tungsten sulfide are preferred catalysts for effecting hydrogenation of compounds containing a thiophene nucleus to compounds containing a thiolane nucleus.

Previously, thiolane, which is also called thiophene and tetrahydrothiophene, has been a laboratory curiosity. The reaction of a 1,4-dihalobutane with potassium sulfide is representative of the modes of preparation previously employed to produce thiolane. This invention provides a method whereby thiolanes can be readily produced in good yields by the hydrogenation of corresponding thiophene compounds.

Recent developments have shown that thiophenes can be produced by the catalytic heterocyclization of aliphatic hydrocarbons. The present invention provides a method whereby thiophenes which have been classified as "chemicals of commerce" as a result of the aforementioned development, can be converted in substantial yield into thiolanes, thus moving thiolanes, another class of heterocyclic derivatives, out of the realm of laboratory curiosities into the purview of "chemicals of commerce."

In general, thiophene and its homologs can be hydrogenated to thiolane and thiolane homologs under the conditions specified in this invention. Thus, thiophene is hydrogenated to thiolane; thiophene homologs, such as isopropylthiophene and isobutylthiophene, are converted to thiolane homologs such as isopropylthiolane and isobutylthiolane.

In accordance with the method of this invention, temperatures between 400 and 600° F. are employed to effect conversion of compounds containing a thiophene nucleus to compounds containing a thiolane nucleus. Advantageously, the hydrogenation is effected at temperatures between 450 and 550° F.; decyclization of the heterocyclic nucleus is kept at a minimum when the temperature is maintained below 550° F.

As a general proposition, the pressure is maintained above 1,000 pounds per square inch during hydrogenation of thiophene compounds to thiolane compounds. Pressures up to and above 20,000 pounds per square inch may be employed; apparatus limitations place the actual upper limit on the pressure range. From an operational viewpoint, it is advisable to employ pressures between about 2,000 and 5,000 pounds per square inch. In batch-type operation, it is advisable to initiate the reaction at a pressure of 2,000 to 4,500 pounds per square inch at room temperature. In continuous operation at temperatures of about 500° F., the pressure should be maintained between about 2,000 and 5,000 pounds per square inch.

The hydrogenation of thiophene compounds to thiolane compounds is effected in the presence of a catalyst comprising mainly an oxide or sulfide of a group VIB metal. Molybdenum sulfide-alumina, $MoS_2$-$Al_2O_3$, and nickel sulfide-tungsten sulfide, $NiS$-$WS_2$, are preferred catalysts for the conversion of thiophenes to thiolanes. Other catalysts such as nickel sulfide-chromia, nickel sulfide-alumina and nickel sulfide-molybdenum sulfide may also be employed to effect conversion of thiophenes to thiolanes.

Nickel sulfide-tungsten sulfide has an approximate composition of about 50 to 75 weight per cent tungsten sulfide and 50 to 25 per cent nickel sulfide. The other preferred catalyst, namely molybdenum sulfide-alumina, contains approximately 7 to 15 weight per cent molybdenum sulfide with the balance comprising substantially alumina.

The hydrogenation of thiophenes to thiolanes can be effected batch-wise in high pressure vessels or can be effected continuously in high pressure equipment specifically designed for continuous high pressure operation. In further description of the invention, batch-wise operation is employed but it is to be understood that the invention is not thereby limited.

In batch-wise operation, high pressure hydrogenation vessels are charged with thiophene reactant and catalyst and are then raised with hydrogen to a pressure between about 2,000 and 4,500 pounds per square inch at room temperature. Thereafter, the hydrogenation vessel is raised to reaction temperature falling between 425 and 575° F. The course of the reaction can be followed by the pressure drop in the hydrogenation vessel.

The following examples, wherein thiophene and its homologs are hydrogenated to compounds containing a thiolane nucleus, illustrate the method of this invention.

Example I 1583 grams of thiophene and 51 grams of molybdenum sulfide-alumina catalyst having an approximate composition of 9 weight per cent molybdenum sulfide and 91 per cent alumina were charged to a high pressure hydrogenation vessel having a capacity of 2800 cc. The vessel was then filled with hydrogen to an initial pressure of about 3400 pounds per square inch at room temperature. Thereafter, the temperature was raised to and maintained at about 450° F. for 151 hours, at the end of which time 1.85 mols of hydrogen had been taken up per mol of thiophene charged. 1,493 grams of liquid product was recovered of which 59 weight per cent was thiolane; this amounted to a yield of about 53 weight per cent on the basis of thiophene charged.

Example II 188 grams of 2-tertiary butyl thiophene and 25 grams of molybdenum sulfide-alumina catalyst having an approximate composition of 9 per cent molybdenum sulfide and 91 per cent alumina were charged to a high pressure hydrogenation vessel having a capacity of about 1026 cc. The vessel was then filled with hydrogen to an initial pressure of about 3100 pounds per square inch at room temperature. The vessel was then raised to and maintained at a temperature of about 520° F. for 10 hours at the end of which time 2.8 mols of hydrogen had been taken up per mol of t-butyl thiophene charged. 170 grams of liquid product was obtained of which 60 weight per cent was 2-t-butyl thiolane, a novel compound; this amounted to a yield of 53 weight per cent on the basis of the t-butyl thiophene charged. The 2-t-butyl thiolane obtained in this fashion had a boiling point of 186–187° C. and had a refractive index of 1.4850 at 20° C. Quantitative analysis showed it to contain 21.9 per cent sulfur as contrasted with a theoretical calculated value of 22.2 per cent.

Example III 185 grams of a 2–$C_8$ alkyl thiophene obtained by the alkylation of thiophene with di-isobutylene. 15 grams of nickel sulfide-tungsten sulfide having the approximate composition of 27.8 weight per cent nickel sulfide and 64.8 per cent tungsten sulfide were also charged to a high pressure hydrogenation vessel having a capacity of 685 cc. Then the vessel was filled with hydrogen to initial pressure of about 3800 pounds per square inch at room temperature. The hydrogenation vessel was then heated to and maintained at a temperature between 510 to 530° F. for 17½ hours at the end of which time 2.9 mols of hydrogen had been taken up per mol of $C_8$ alkyl thiophene charged. 165 grams of liquid product was obtained of which 35 weight per cent was a 2–$C_8$ alkyl thiolane, a novel compound; this amounted to a yield of about 30 weight per cent on the basis of $C_8$ alkyl thiophene charged. The 2–$C_8$ alkyl thiolane obtained in this fashion had a boiling point of 252–253° C. at atmospheric pressure and a refractive index of 1.4801 at 20° C.; quantitative analysis showed that the 2–$C_8$ alkyl thiolane contained 15.4 per cent sulfur as contrasted with a calculated theoretical value of 16.0 per cent.

The use of temperatures higher than about 600° F. in the hydrogenation of thiophene compounds to thiolanes results in ring splitting and loss of hydrogen sulfide to form a product mixture comprising mainly alkyl mercaptans and aliphatic hydrocarbons. Consequently, it is necessary to observe the prescribed temperature conditions in order to obtain substantial yields of thiolane derivatives by the hydrogenation of thiophene compounds.

Obviously many modifications and variations of the invention, as hereinbefore set forth, may be made without departing from the spirit and scope thereof and, therefore, only such limitations should be imposed as are indicated in the appended claims.

I claim:

1. A method for preparing thiolane and its homologs which comprises introducing hydrogen and a compound selected from the group consisting of thiophene and thiophene homologs into a reaction zone maintained at a temperature of 400 to 600° F. and a pressure between 1000 p. s. i. and 5,000 p. s. i. and containing a hydrogenation catalyst comprising mainly a compound selected from the group consisting of oxides and sulfides of group VI metals removing a product from said reaction zone and recovering a thiolane compound from said product.

2. The method according to claim 1 in which the catalyst is molybdenum sulfide-alumina.

3. The method according to claim 1 in which the catalyst is nickel sulfide-tungsten sulfide.

4. A method for preparing thiolane and its homologs which comprises introducing hydrogen and a compound selected from the group consisting of thiophene and thiophene homologs into a reaction zone maintained at a temperature of 450 to 550° F. and at a pressure between 2000 and 5000 p. s. i. and containing a hydrogenation catalyst comprising mainly compounds selected from the group consisting of oxides of sulfides of group VI metals removing a product from said reaction zone and recovering a thiolane compound from said product.

5. A method for preparing thiolane which comprises introducing hydrogen and thiophene into a reaction zone maintained at a temperature of 400 to 600° F. and at a pressure between 2000 and 5000 p. s. i. and containing a hydrogenation catalyst comprising mainly a compound selected from the group consisting of oxides and sulfides of group VI metals removing a product from said reaction zone and recovering thiolane from said product.

6. The method according to claim 5 in which the catalyst is molybdenum sulfide-alumina.

7. The method according to claim 5 in which the catalyst is nickel sulfide-tungsten sulfide.

8. A method for preparing 2-tertiary butyl thiolane which comprises introducing hydrogen and 2-tertiary butyl thiophene into a reaction zone maintained at temperatures of 400 to 600° F. and at a pressure between 2000 and 5000 pounds per square inch and containing a hydrogenation catalyst comprising mainly a compound selected from the group consisting of oxides and sulfides of group VI metals removing a product from said reaction zone and recovering 2-tertiary butyl thiolane from said product.

9. The method according to claim 8 in which the catalyst is molybdenum sulfide-alumina.

10. The method according to claim 8 in which the catalyst is nickel sulfide-tungsten sulfide.

11. A method for preparing a 2–$C_8$ alkyl thiolane which comprises introducing a 2–$C_8$ alkyl thiophene obtained by the alkylation of thiophene and di-isobutylene with hydrogen into a reaction zone maintained at a temperature of 400 to 600° F. and at a pressure of 2000 to 5000 p. s. i. and containing a hydrogenation catalyst comprising mainly a compound selected from the group consisting of oxides and sulfides of group VI metals removing a product from said reaction zone and recovering said $C_3$ alkyl thiolane from said product.

12. The method according to claim 11 in which the catalyst is molybdenum sulfide-alumina.

13. The method according to claim 11 in which the catalyst is nickel sulfide-tungsten sulfide.

GEORGE BATES HATCH.

References Cited in the file of this patent

UNITED STATES PATENTS

| Number | Name | Date |
| --- | --- | --- |
| 2,429,575 | Appleby | Oct. 21, 1947 |
| 2,440,671 | Boyd | May 4, 1948 |
| 2,471,077 | Moore | May 24, 1949 |
| 2,487,051 | Mozingo | Nov. 8, 1949 |

OTHER REFERENCES

Moldawski et al., J. Applied Chem. (U. S. S. R.) 5, 626–627 (1932).

Chemical Abstracts 29: 1814–1 (1935).

Chemical Abstracts 27: 274–6 (1933).